United States Patent [19]

Takeuchi et al.

[11] 4,440,156
[45] Apr. 3, 1984

[54] SOLAR HEAT COLLECTOR

[75] Inventors: Hirosato Takeuchi; Toshio Mikiya, both of Tokyo, Japan

[73] Assignee: Nitto Kohki Co., Ltd., Tokyo, Japan

[21] Appl. No.: 395,467

[22] Filed: Jul. 6, 1982

[30] Foreign Application Priority Data

Jul. 6, 1981 [JP] Japan .................. 56-100331[U]

[51] Int. Cl.³ ............................................. F24J 3/02
[52] U.S. Cl. ................................. 126/443; 165/178
[58] Field of Search ................... 126/442, 443, 450; 165/177, 178, 172

[56] References Cited

U.S. PATENT DOCUMENTS

| | | | |
|---|---|---|---|
| 3,227,153 | 1/1966 | Godel | 126/448 |
| 3,952,724 | 4/1976 | Pei | 126/443 |
| 4,027,653 | 6/1977 | Meckler | 126/443 |
| 4,122,831 | 10/1978 | Mahdjuri | 126/442 |
| 4,133,298 | 1/1979 | Hayama | 126/438 |
| 4,186,724 | 2/1980 | Nelson | 126/443 |
| 4,186,725 | 2/1980 | Schwartz | 126/443 |
| 4,308,857 | 1/1982 | Sims | 126/443 |
| 4,397,304 | 8/1983 | Villian | 126/442 |

Primary Examiner—Daniel J. O'Connor
Attorney, Agent, or Firm—Birch, Stewart, Kolasch & Birch

[57] ABSTRACT

A solar heat collector including an outer subtantially straight tube being closed at one end and open at the other end and an inner substantially straight tube being closed at one end and open at the other end. The inner and outer tubes are hermetically sealed at their open ends with the space therebetween being evacuated to a predetermined degree of vacuum. A hairpin pipe for circulation of fluid media is disposed within the inner tube and includes two substantially straight sections wherein both or at least one of which is in surface contact with the inner surface of the inner tube. A pair of heat-conducting members are disposed within the inner tube and include arc portions and inwardly bent flat portions. The arc portions are semi-circular in shape and are joined to the inwardly bent flat portions through transient portions inclined at an angle $\theta$ wherein $120° \leq \theta \leq 150°$. The heat-conducting members are biased diametrically to ensure contact of both or at least one of the substantially straight sections of the hairpin pipe against the inner surface of the inner pipe.

7 Claims, 3 Drawing Figures

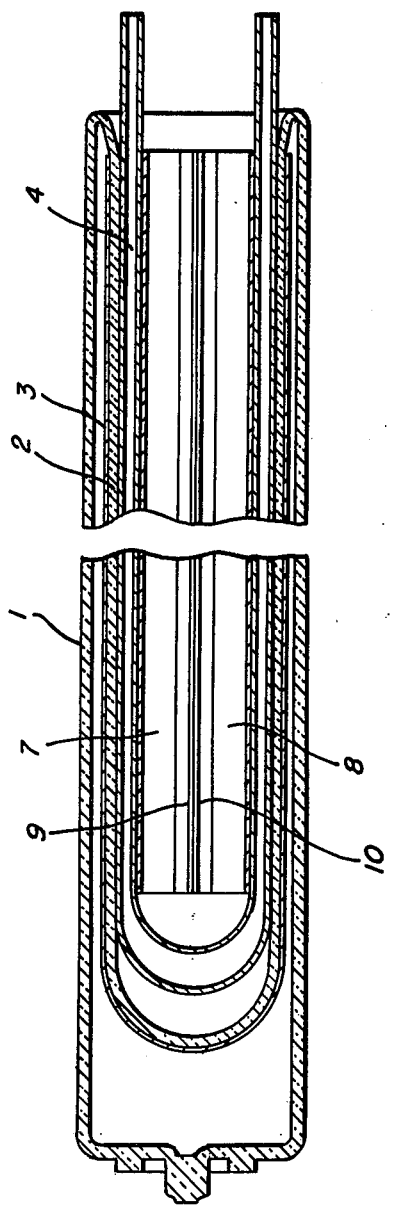
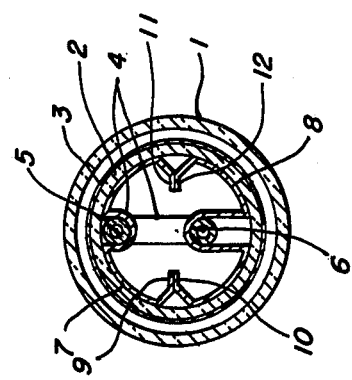
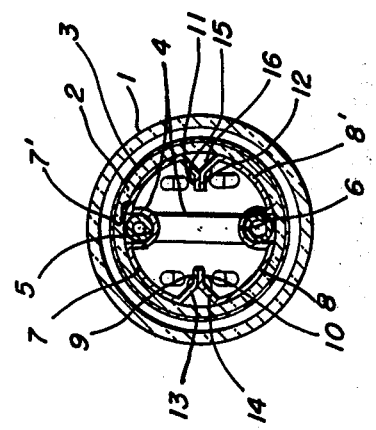

SOLAR HEAT COLLECTOR

BACKGROUND OF THE INVENTION

Currently available solar heat collectors of the evacuated double-tubing type are similar to U.S. Pat. No. 2,460,482 or even U.S. Pat. No. 980,505. The currently available solar heat collectors typically include an outer straight glass tube being closed at one end and open at the other end, and an inner straight glass tube of a lesser diameter which is also closed at one end and open at the other end. Both tubes are hermetically sealed at their open ends, and the space therebetween is evacuated to a predetermined degree of vacuum. The inner tube is then provided over its outer surface with a solarheat absorbing film.

To make effective use of the collected solar heat, U.S. Pat. No. 3,952,724 teaches that a hairpin metal pipe for circulation of fluid media may be inserted into the above-mentioned collectors.

With this known arrangement, how the collected solar heat is transmitted to the metal pipe is of vital importance. However, to date, an ideal solution to such a problem has not yet been uncovered.

SUMMARY OF THE INVENTION

The present invention has for its main object to improve the efficiency of transmission of heat to a metal pipe for circulation of fluid media wherein the metal pipe is disposed within glass tubing of a solar heat collector.

According to the present invention, this object is achieved by the provision of a solar heat collector of the evacuated double-tubing type comprising an outer straight glass tube being closed at one end and open at the other end, and an inner straight glass tube of a lesser diameter than that of said outer tube, which is closed at one and open at the other end. The inner and outer tubes hermetically sealed at their open ends with the space therebetween being evacuated to a predetermined degree of vacuum, and a solar heatabsorbing film is applied over the outer surface of the inner tube.

The present invention further includes a hairpin metal pipe for circulation of fluid media positioned inside the inner tube with both or either one of its opposing straight pipe portions being in contact with the inner surface of said inner tube, and a pair of heat-conducting members are inserted within the inner tube and brought in surface contact with the inner surface thereof. The pair of heat-conducting members have a high thermal conductivity and are of a generally semicircular shape in cross section and include central grooves designed to come in surface contact with said straight pipe portions of said hairpin pipe and surround them. The heat-conducting members have their both lateral sides comprised of inclined portions for bringing their outer surfaces into resilient surface contact with the inner surface of said inner tube and flat portions designed to be in surface contact with each other.

BRIEF DESCRIPTION OF THE DRAWINGS

This and other objects and features of the present invention will become apparent from a reading of the following detailed explanation of preferred embodiments with reference to the accompanying drawings, in which:

FIG. 1 is a longitudinal section of one preferred embodiment of the present invention;

FIG. 2 is a cross-sectional view of the preferred embodiment; and

FIG. 3 is a cross-sectional view of another embodiment of the present invention.

Throughout the drawings, the solar heat-absorbing film 3 is exaggerated for its better illustration.

DETAILED EXPLANATION OF PREFERRED EMBODIMENTS

An outer glass tube 1 is formed as a substantially straight glass tube being closed at one end and open at the other end. An inner glass tube 2 is also formed as a substantially straight glass tube being closed at one end and open at the other end, but is smaller in both length and diameter with respect to said outer glass tube 1. A solar heat-absorbing film 3 is applied over the outer surface of the inner glass tube 2. The solar heat-absorbing film 3 is similar to that used in prior art collectors in that it is designed to prevent the heat collected in the inner glass tube 2 from being transmitted to the outer glass tube 1. As is the case with the prior art, the outer and inner glass tubes are hermetically sealed at their open ends with the space therebetween being evacuated to a predetermined degree of vacuum.

A substantially U-shaped metal pipe 4, preferably constructed from copper, is designed for circulation of fluid media. The metal pipe 4 is positioned within the inner glass tube 2 in such a manner that both or either one of the substantially straight pipe sections come in linear contact with the inner surface of the inner glass tube 2, as illustrated in FIGS. 1 and 2 or 3, respectively.

Heat-conducting members 7, 8 are inserted in the inner glass tube 2, and brought into surface contact with the inner surface thereof for supporting the metal pipe 4. Each support member 7, 8 is preferably constructed of a thin metal plate which excels in both thermal conductivity and bending elasticity. The heat-conducting members 7, 8 are of a generally semicircular shape in cross section with a length somewhat shorter than that of the inner glass tube 2, and include in a central portion a groove 5 or 6 designed to come into uniform surface contact with the straight portion of the metal pipe 4 and surround it.

As illustrated in FIGS. 2 and 3, the support members 7, 8 include arc portions 7', 8' bent inwardly on both sides into flat portions 9, 10, 11, 12. One pair of flat portions 9, 11 are brought into resilient surface contact with another pair of flat portions 10, 12, respectively. The arc portions 7', 8' are joined to the flat portions 9, 10, 11, 12 through transient portions 13, 14, 15, 16 which are inclined at a given angle $\theta$ ($120° \leq \theta \leq 150°$). The transient portions 13, 14, 15, 16 are of a given length such that two sets of the flat portions 9, 10, 11 and 12 are energized or biased diametrically, and arc portions 7', 8' are brought into surface contact with the inner plane of the inner glass tube 2.

In the first embodiment of the present invention, as illustrated in FIG. 2, both substantially straight pipe sections disposed in the grooves 5, 6 of the heat-conducting members 7, 8 are in contact with the inner surface of the inner glass tube 2. In the second embodiment, as illustrated in FIG. 3, the substantially straight section of the hairpin pipe 4 disposed within the groove 5 of the heat-conducting member 7 is in contact with the inner surface of the inner glass tube 2 whereas the substantially straight section disposed within the groove 6 of the heat-conducting member 8 is not in contact with the inner surface of the inner glass tube 2.

According to the inventive arrangement as mentioned above, the amount of heat collected by the inner glass tube 2 is very effectively transmitted to the metal pipe 4 for circulation of fluid media for heating the fluid media flowing therethrough due to good conductivity and reflectivity of the heat-conducting members in direct surface contact with the inner glass tube 2 as well as a limited convection area defined thereby. Furthermore, since the fluid inflow pipe section and the fluid outflow pipe section are separately supported by the heat-conducting members 7, 8, the contact force, viz., the enlarging force, that they exert on the inner surface of the inner glass tube 2 by their flat and inclined portions, is more uniformly dispersed compared to the conventional system in which the inflow and outflow sections are supported by support members for the pipes. Thus the heat-conducting members are firmly maintained in surface contact with the inner surface of the inner tube at virtually equal pressure, so that good transmission of heat to the metal pipe 4 is attained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A solar heat collector of the evacuated double-tubing type comprising:
    an outer substantially straight tube being closed at one end and open at the other end;
    an inner substantially straight tube of a lesser diameter relative to said outer tube, being closed at one end and open at the other end;
    said inner and outer tubes being hermetically sealed at their open ends with the space therebetween being evacuated to a predetermined degree of vacuum;
    a solar heat-absorbing film disposed over the outer surface of said inner tube;
    a substantially U-shaped hairpin pipe for circulation of fluid media and including substantially straight pipe portions being positioned inside said inner tube with both opposing substantially straight pipe portions being in contact with the inner surface of said inner tube; and
    a pair of heat-conducting members inserted in said inner tube and being brought into surface contact with the inner surface thereof;
    said pair of heat-conducting members being of a generally semicircular shape in cross section and each including a groove disposed substantially in a central portion thereof designed to come in surface contact with said straight pipe sections of said hairpin pipe;
    said pair of heat-conducting members having their both lateral sides comprised of inclined portions for bringing their outer surfaces into resilient surface contact with the inner surface of said inner tube and flat portions designed to be in surface contact with each other.

2. A solar heat collector of the evacuated double-tubing type comprising:
    an outer substantially straight tube being closed at one end and open at the other end;
    an inner substantially straight tube of a lesser diameter relative to said outer tube, being closed at one end and open at the other end;
    said inner and outer tubes being hermetically sealed at their open ends with the space therebetween being evacuated to a predetermined degree of vacuum;
    a solar heat-absorbing film disposed over the outer surface of said inner tube;
    a substantially U-shaped hairpin pipe for circulation of fluid media and including substantially straight pipe portions being positioned inside said inner tube with either one of the opposing substantially straight pipe portions being in contact with the inner surface of said inner tube; and
    a pair of heat-conducting members inserted in said inner tube and being brought into surface contact with the inner surface thereof;
    said pair of heat-conducting members being of a generally semicircular shape in cross section and each including a groove disposed substantially in a central portion thereof designed to come in surface contact with said straight pipe sections of said hairpin pipe;
    said pair of heat-conducting members having their both lateral sides comprised of inclined portions for bringing their outer surfaces into resilient surface contact with the inner surface of said inner tube and flat portions designed to be in surface contact with each other.

3. A solar heat collector according to claim 1 or 2, wherein said outer and inner tubes are glass tubes.

4. A solar heat collector according to claim 1 or 2, wherein said hairpin pipe is a metal pipe.

5. A solar heat collector according to claim 1 or 2, wherein said inclined transient portions are inclined at an angle $\theta$ wherein:

$$120° \leq \theta \leq 150°.$$

6. A solar heat collector according to claim 1 or 2, wherein said support members are constructed from a thin metal plate.

7. A solar heat collector according to claim 1 or 2, wherein said flat portions of said support members are movable in a countercentrifugal direction.

* * * * *